UNITED STATES PATENT OFFICE

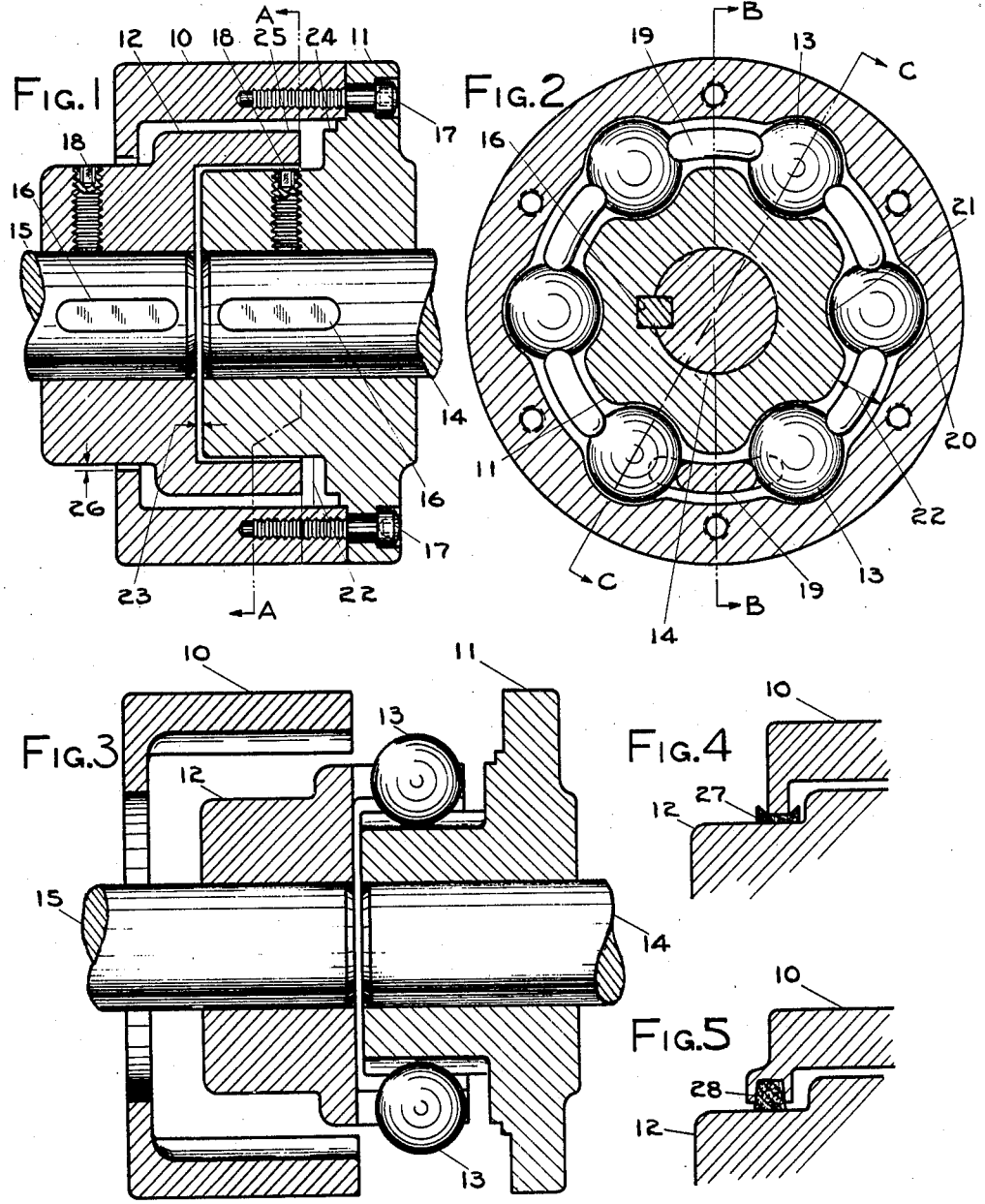

HOWARD MAURICE EDMUNDS, OF NEW YORK, N. Y., ASSIGNOR TO CROCKER-WHEELER ELECTRIC MANUFACTURING COMPANY, OF AMPERE, NEW JERSEY, A CORPORATION OF NEW JERSEY

SHAFT COUPLING

Application filed May 9, 1932. Serial No. 610,172.

The object of this invention is to provide a coupling for two shafts, as for example the shaft of an electric motor and the shaft of a machine to be driven by the motor, and it is required to transmit power with torsional resilience and provide for slight axial or lateral misalignment between the driving and the driven shafts without harm. A further object is to distribute the driving torque between a number of elastic transmitting elements, and to provide convenient means for the removal and renewal of these elements and for the disconnection of the coupling. A further object is to provide a coupling which, while providing free float between the two coupling members, will restrict this float within definite limits and provide complete thrust resistance beyond these limits. A further object is to protect the elastic elements which transmit the torque from oil or other deleterious matter.

In the accompanying sheet of drawing which forms a part of this description,

Figure 1 is a longitudinal section through a coupling embodying this invention on the line B—B of Fig. 2.

Fig. 2 is a transverse section through the coupling on the line A—A of Fig. 1.

Fig. 3 is a longitudinal section on the line C—C of Fig. 2 showing the cover piece partially removed, to show how the rubber balls are uncovered for removal and renewal.

Figs. 4 and 5 show two means for sealing the coupling with felt to prevent ingress of oil to the rubber balls.

One of the coupling members is in two separable parts, a cover piece 10, and a flanged piece 11 with cooperating cylindrical pocket segments parallel to the axis of the coupling. The two parts are attached together and are separable from each other in the direction of the axis of the coupling. The other coupling member is a spider 12 and a hub with a shoulder. The two coupling members are connected by rubber balls 13 in the preferred type shown. The coupling members are attached to the shafts 14 and 15 by keys 16 and setscrews 18. Cap screws 17 attach the cover piece to the flanged piece. The spider has tongues 19 which are wider at their tips so that the balls cannot shift toward the ends of the tongues. In this member the freedom of the balls is chiefly in a radial direction, while in the member with the cylindrical pocket segments the freedom is in the axial direction of the coupling. The flanged piece and the cover piece are spaced apart leaving a gap 22 in which the tongues of the spider lie. The two coupling members and the ends of the two shafts are spaced apart slightly as shown at 23. A machined shoulder 24 is provided in the side of the flange with the same outside diameter as the spider to facilitate the aligning of the coupling members when setting the machines that carry the shafts.

In installing the coupling, the flanged piece is placed in position on one of the shafts and the spider is placed in position on the other of the shafts to be coupled. The cover piece is placed over the spider before the spider is put on the shaft. The two shafts are lined up by placing a straight edge against the machined outside surface of the spider and against the shoulder at the side of the flange of the other coupling member while the cover piece is slipped back out of the way. The balls are next placed between the tongues, which are so shaped as to hold the balls snugly in position. The cover piece is next attached to the flange of the flanged piece by the cap screws, thereby making an oil-tight joint. The cover piece has an inturned lip which lies behind the shoulder on the spider and limits the separation of the members of the coupling and of the shafts. Approach of the members is also definitely limited when the space between the ends of the shafts or between the coupling members is closed. The pocket segments in the coupling member consisting of the cover piece and the flanged piece being cylindrical in form do not restrict axial movement of this coupling member with respect to the balls except through their elastic resistance. These pockets are slightly larger in diameter than the balls so as to give free articulation through small angles of the two coupling members and allow for a small amount of lateral displacement. This coupling provides for inspection and for removal of and replacement of the balls by unscrewing the cap screws and drawing away the cover. The balls are consequently removable without separation of the coupling members as by slipping one or the other back on the shaft or by detaching one or the other of the coupled machines from its base, as usually neither of these methods is a simple matter and may not be practicable. If the balls are removed and the cover replaced, the shafts will thereby be disconnected and either can be turned independently of the other.

In many places where a coupling is required, as for example where machine tools are used, it is likely to be splashed with oil, which, if it should reach the rubber balls, will have a deleterious effect. The construction of this coupling is such that oil cannot find its way to the balls except through the small gap 26 which is where oil is not likely to enter. For the more certain exclusion of oil, felt rings may be inserted as shown in Figs. 5 or 6. As the two members rotate together, except for the small angular change due to the varying compression of the balls with varying loads, the felt seals are not subject to wear by friction as they would if one member were stationary and the other rotating.

I claim,

1. A shaft coupling comprising a pair of coupling members, one of the coupling members consisting of a spider and a hub and the other coupling member consisting of a flanged piece and a cover piece with cooperating cylindrical pocket segments parallel to the axis of the coupling, the cover piece being attached to the flanged piece and separable therefrom in the direction of the axis of the coupling, and resilient elements positioned in said pocket segments for connecting the members.

2. A shaft coupling comprising a pair of coupling members, one of the coupling members consisting of a spider and a hub with a shoulder and the other coupling member consisting of a flanged piece and a cover piece with cooperating cylindrical pocket segments, the cover piece being attached to the flanged piece and having an inturned lip behind the shoulder of the hub which carries the spider, and resilient elements positioned in said pocket segments for connecting the members.

3. A shaft coupling comprising a pair of coupling members, one of the coupling members consisting of a spider and a hub and the other coupling member consisting of a flanged piece and a cover piece with cooperating cylindrical pocket segments, the cover piece being attached to the flanged piece and the flanged piece having a machined shoulder with the same outside diameter as the spider, and resilient elements positioned in said pocket segments for connecting the members.

4. A shaft coupling comprising a pair of coupling members, one of the coupling members consisting of a spider with tongues widened out at the tips and the other coupling member having cooperating cylindrical pocket segments with a gap between them within which the tongues lie, and balls positioned in said pocket segments for connecting the members, the balls having radial freedom only with respect to one of the members and freedom in an axial direction with respect to the other member.

5. A shaft coupling comprising a pair of coupling members, one of the coupling members consisting of a spider with tongues widened out at the tips and the other coupling member consisting of a flanged piece and a cover piece with cooperating cylindrical pocket segments, the cover piece being attached to the flanged piece with a gap between them within which the tongues lie, and balls positioned in said pocket segments for connecting the members, the balls having radial freedom only with respect to the spider and freedom in an axial direction with respect to the other coupling member.

HOWARD MAURICE EDMUNDS.